United States Patent
Lu et al.

(10) Patent No.: US 10,310,318 B2
(45) Date of Patent: Jun. 4, 2019

(54) DISPLAY APPARATUS

(71) Applicant: Au Optronics Corporation, Hsinchu (TW)

(72) Inventors: Min-Chou Lu, Hsinchu (TW); Chun-Sheng Li, Kaohsiung (TW)

(73) Assignee: Au Optronics Corporation, Hsinchu (TW)

(*) Notice: Subject to any disclaimer, the term of this patent is extended or adjusted under 35 U.S.C. 154(b) by 24 days.

(21) Appl. No.: 15/659,611

(22) Filed: Jul. 25, 2017

(65) Prior Publication Data
US 2017/0322447 A1    Nov. 9, 2017

Related U.S. Application Data

(63) Continuation of application No. 14/708,312, filed on May 11, 2015, now abandoned.

(30) Foreign Application Priority Data

Dec. 11, 2014  (TW) .............................. 103143283 A

(51) Int. Cl.
  *G02F 1/1333*    (2006.01)
  *G02F 1/1335*    (2006.01)

(52) U.S. Cl.
  CPC ........... *G02F 1/133512* (2013.01); *G02F 2001/133302* (2013.01); *G02F 2001/133354* (2013.01); *G02F 2001/133388* (2013.01); *G02F 2201/56* (2013.01)

(58) Field of Classification Search
  None
  See application file for complete search history.

(56) References Cited

U.S. PATENT DOCUMENTS

| | | | | |
|---|---|---|---|---|
| 2002/0093619 A1* | 7/2002 | Furuie | ................... | C09K 19/02 349/167 |
| 2006/0279687 A1* | 12/2006 | Park | ...................... | G02F 1/1333 349/142 |
| 2010/0271572 A1* | 10/2010 | Yokogawa | ............ | G02F 1/1333 349/96 |
| 2015/0156867 A1* | 6/2015 | Kim | ................... | G02F 1/13452 361/767 |
| 2016/0118370 A1* | 4/2016 | Wu | ....................... | H01L 25/167 362/19 |

FOREIGN PATENT DOCUMENTS

JP    10-282464    * 10/1998

* cited by examiner

*Primary Examiner* — Ryan Crockett
(74) *Attorney, Agent, or Firm* — JCIPRNET

(57) ABSTRACT

A display apparatus includes a first substrate, a first shielding layer, a first optical film, a second substrate, and a display medium. The first shielding layer is located on the first substrate and has a first alignment pattern. The first optical film is located on the first substrate. The first optical film has a second alignment pattern on a side edge of the first optical film. The first alignment pattern and the second alignment pattern are overlapped with each other. The second substrate is located opposite to the first substrate. The display medium is sandwiched between the first substrate and the second substrate.

18 Claims, 15 Drawing Sheets

DISPLAY APPARATUS

CROSS-REFERENCE TO RELATED APPLICATION

This application is a continuation application of and claims the priority benefit of a prior application Ser. No. 14/708,312, filed on May 11, 2015, now pending. The prior application Ser. No. 14/708,312 claims the priority benefit of Taiwan application serial no. 103143283, filed on Dec. 11, 2014. The entirety of each of the above-mentioned patent applications is hereby incorporated by reference herein and made a part of this specification.

FIELD OF THE INVENTION

The disclosure relates to an electronic device and more particularly relates to a display apparatus.

DESCRIPTION OF RELATED ART

With the rise of wearable apparatuses, the conventional display apparatus shaped as rectangles can no longer satisfy users' requirements. The wearable apparatus may be equipped with a non-rectangular display apparatus, e.g., a circular display apparatus, a right triangular display apparatus, a right pentagonal display apparatus, a right hexagonal display apparatus, etc.

In general, the display apparatus includes a first substrate, a second substrate opposite to the first substrate, a display medium located between the first substrate and the second substrate, a first optical film fixed onto an upper surface of the first substrate, and a second optical film fixed onto a lower surface of the second substrate. If the display apparatus is not shaped as a rectangle, e.g., if the display apparatus is circular, and if the first substrate, the second substrate, the first optical film, and the second optical film of the display apparatus are not rectangular (e.g., circular), it is rather difficult for manufacturers to correctly position the first optical film (and/or the second optical film) onto the first substrate (and/or the second substrate) according to the corresponding relationship between the shape of the profile of the first substrate (and/or the second substrate) and the shape of the profile of the first optical film (and/or the second optical film). Namely, if the display apparatus is not rectangular, e.g., if the display apparatus is circular, it is very much likely for the manufacturers to position the first optical film (and/or the second optical film) onto the first substrate (and/or the second substrate) incorrectly, which may deteriorate the optical characteristics of the display apparatus.

SUMMARY OF THE INVENTION

The disclosure is directed to a display apparatus capable of resolving the issue of the deteriorated optical characteristics of the non-rectangular display apparatus.

In an embodiment of the invention, a display apparatus that includes a first substrate, a first shielding layer, a first optical film, a second substrate, and a display medium is provided. The first shielding layer is located on the first substrate and has a first alignment pattern. The first optical film is located on the first substrate. The first optical film has a second alignment pattern on a side edge of the first optical film. The first alignment pattern and the second alignment pattern are overlapped with each other. The second substrate is disposed opposite to the first substrate. The display medium is sandwiched between the first substrate and the second substrate.

In an embodiment of the invention, another display apparatus that includes a first substrate, a first shielding layer, a first optical film, a second substrate, and a display medium is provided. The first substrate is circular. The first shielding layer is located on the first substrate and has a first alignment pattern. The first optical film is located on the first substrate. The first optical film has a second alignment pattern, and the first alignment pattern and the second alignment pattern are overlapped with each other. The second substrate is located opposite to the first substrate. The display medium is sandwiched between the first substrate and the second substrate.

In an embodiment of the invention, a display apparatus that includes a display panel is provided. The display panel includes a first substrate, a color filter layer, a first shielding layer, a second substrate, a display medium, and a first optical film. The first substrate is circular. The color filter layer is located on the first substrate. The first shielding layer is located on the first substrate and has a first alignment pattern. The first shielding layer is a black matrix. The second substrate is located opposite to the first substrate. The second substrate is circular. The display medium is sandwiched between the first substrate and the second substrate. The first optical film has a second alignment pattern on a side edge of the first optical film. The first alignment pattern and the second alignment pattern are overlapped with each other.

In view of the above, in the display apparatus provided in an embodiment of the invention, the first alignment pattern of the first shielding layer and the second alignment pattern of the first optical film are overlapped with each other for alignment, and thereby the issue of the deteriorated optical characteristics of the display apparatus due to misalignment can be resolved.

Several exemplary embodiments accompanied with figures are described in detail below to further describe the invention in details.

DETAILED DESCRIPTION OF DISCLOSED EMBODIMENTS

Figure 1:
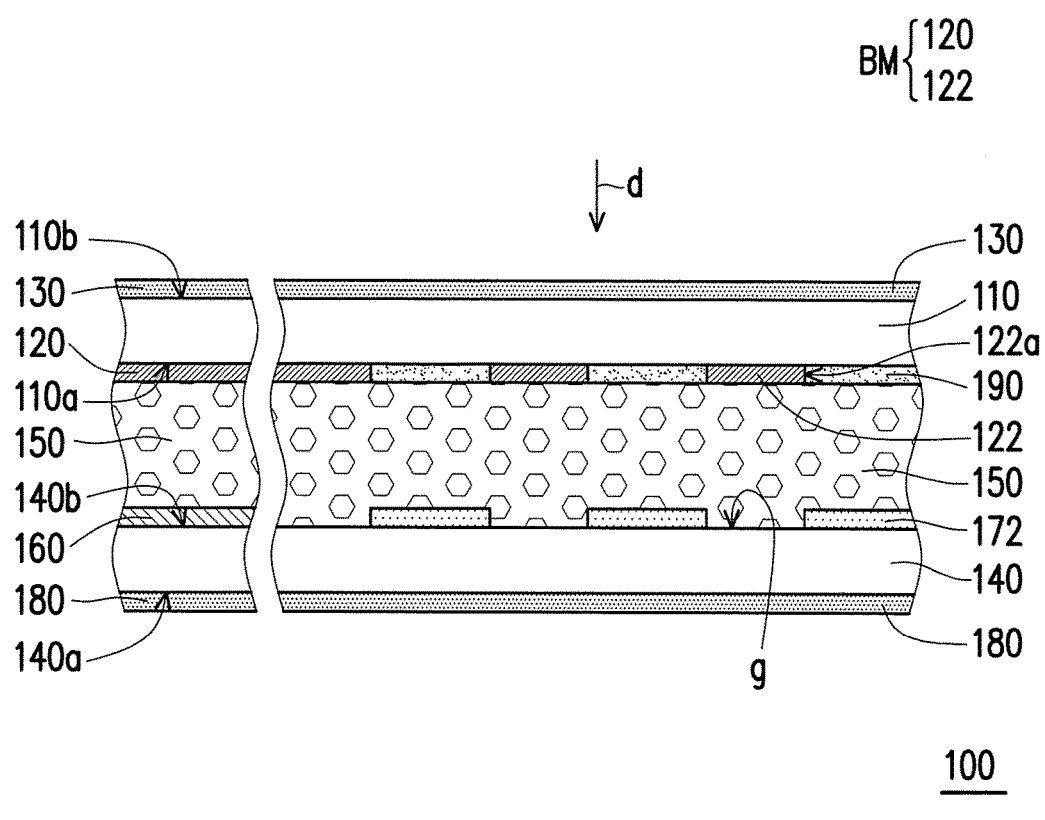
FIG. 1 is a schematic cross-sectional view illustrating a display apparatus according to an embodiment of the invention.
Figure 2:
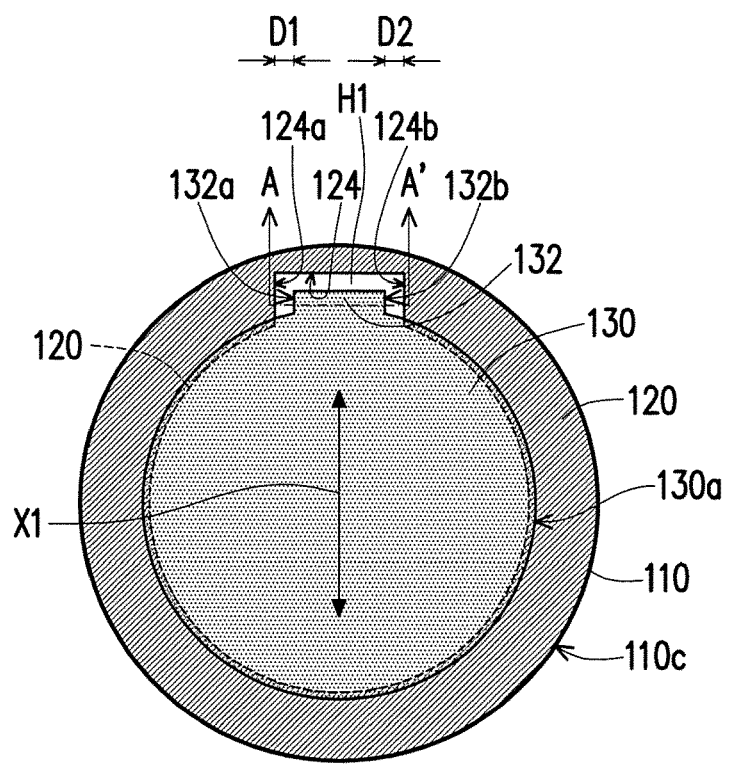
FIG. 2 is a schematic top view illustrating the first optical film, the first substrate, and the first shielding layer of the display apparatus depicted in FIG. 1.
Figure 3:
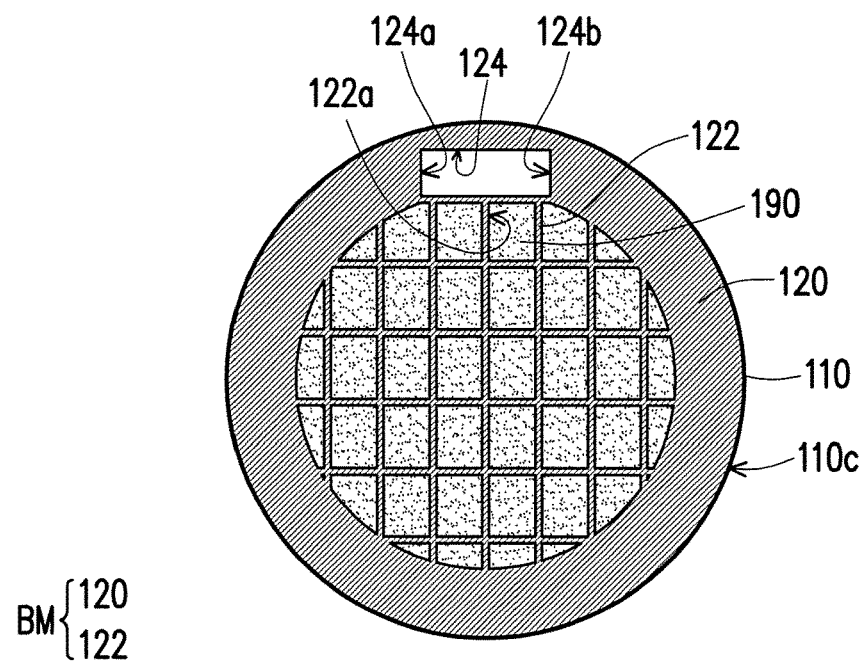
FIG. 3 is a schematic top view illustrating the first substrate, the first shielding layer, and a meshed shielding pattern of the display apparatus depicted in FIG. 1.
Figure 4:
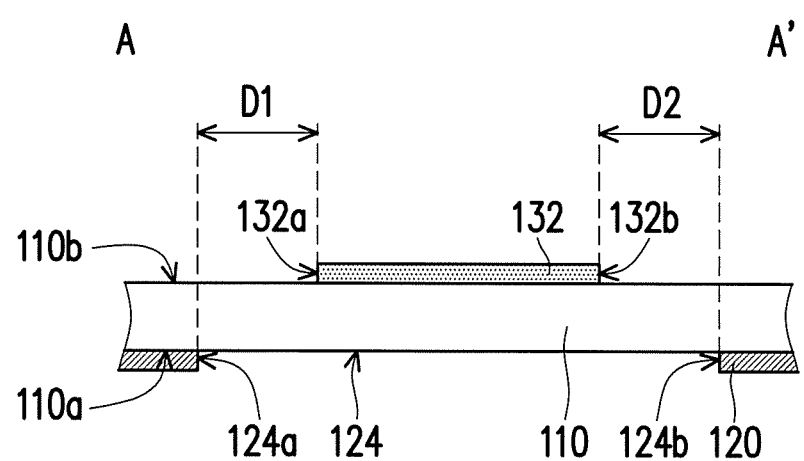
FIG. 4 is a schematic cross-sectional view illustrating the first optical film, the first substrate, and the first shielding layer taken along a section line A-A' depicted in FIG. 2.
Figure 5:
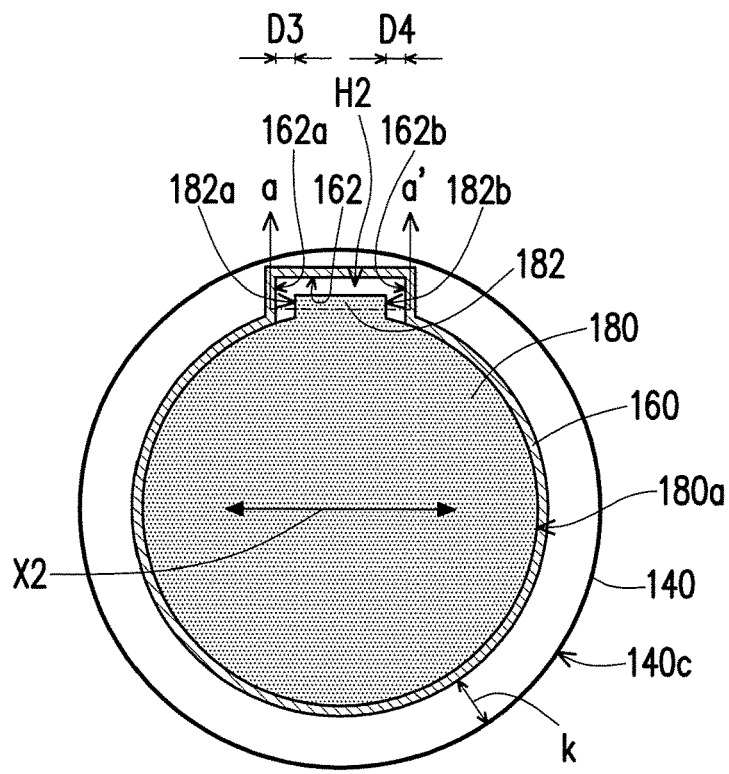
FIG. 5 is a schematic top view illustrating the second optical film, the second substrate, and the second shielding layer of the display apparatus depicted in FIG. 1.
Figure 6:
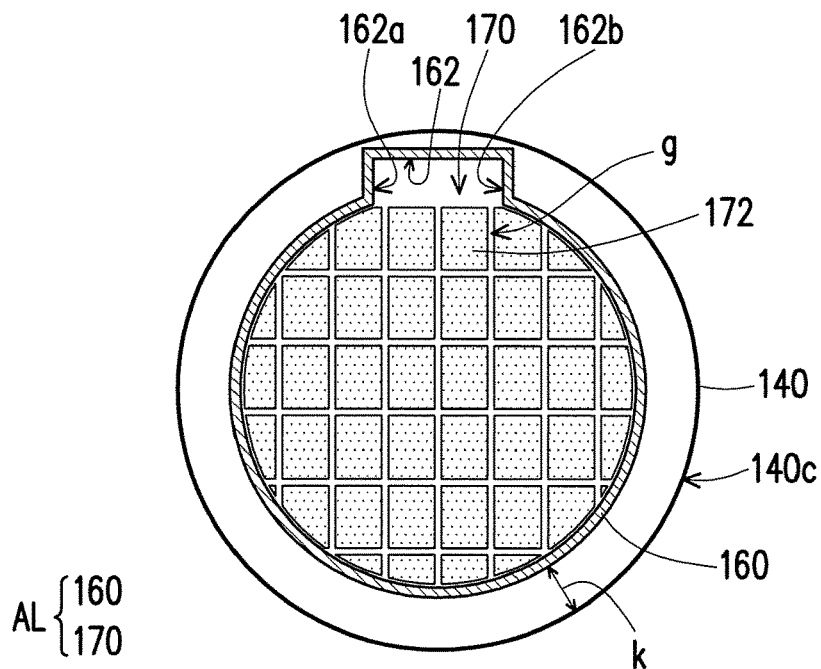
FIG. 6 is a schematic top view illustrating the second substrate and the second shielding layer of the display apparatus depicted in FIG. 1.
Figure 7:
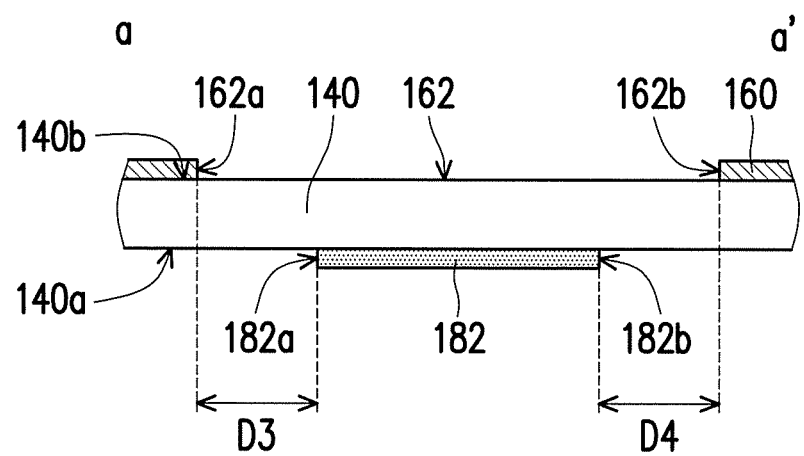
FIG. 7 is a schematic cross-sectional view illustrating the second optical film, the second substrate, and the second shielding layer taken along a section line a-a' depicted in FIG. 5.

FIG. 1 is a schematic cross-sectional view illustrating a display apparatus according to an embodiment of the invention. FIG. 2 is a schematic top view illustrating the first optical film, the first substrate, and the first shielding layer of the display apparatus depicted in FIG. 1. FIG. 3 is a schematic top view illustrating the first substrate, the first shielding layer, and a meshed shielding pattern of the display apparatus depicted in FIG. 1. FIG. 4 is a schematic cross-sectional view illustrating the first optical film, the first substrate, and the first shielding layer taken along a section line A-A' depicted in FIG. 2. FIG. 5 is a schematic top view illustrating the second optical film, the second substrate, and the second shielding layer of the display apparatus depicted in FIG. 1. FIG. 6 is a schematic top view illustrating the second substrate and the second shielding layer of the display apparatus depicted in FIG. 1. FIG. 7 is a schematic cross-sectional view illustrating the second optical film, the second substrate, and the second shielding layer taken along a section line a-a' depicted in FIG. 5. The display apparatus 100 is described hereinafter with reference to FIG. 1 to FIG. 7.

With reference to FIG. 1, a display apparatus 100 includes a first substrate 110, a first shielding layer 120, a first optical film 130, a second substrate 140, and a display medium 150. In the present embodiment, the display apparatus 100 may further include a second shielding layer 160 and a second optical film 180. Besides, the display apparatus 100 further includes a plurality of pixel units 172 arranged in an array (i.e., an active array 170 shown in FIG. 6). The second shielding layer 160 and the active array 170 constitute an active array layer AL. The structure of the pixel units 172 may be the same as the structure of the pixel units in any known display panel. For instance, each pixel unit 172 includes a pixel electrode (not shown) and an active device (not shown) that has a source, a gate, and a drain electrically connected to the pixel electrode. The active array 170 (shown in FIG. 6) may further include a plurality of data lines (not shown) and a plurality of scan lines (not shown) lying across the data lines. Each data line is electrically connected to the source of the active device, and each scan line is electrically connected to the gate of the active device correspondingly.

With reference to FIG. 1, the first shielding layer 120 and the first optical film 130 are located on the first substrate 110. The second shielding layer 160 and the second optical film 180 are located on the second substrate 140. The second substrate 140 is located opposite to the first substrate 110. The display medium 150 is sandwiched between the first substrate 110 and the second substrate 140. Particularly, in the present embodiment, the first substrate 110 has a lower surface 110a and an upper surface 110b. The first shielding layer 120 is located on the lower surface 110a of the first substrate 110, and the first optical film 130 is located on the upper surface 110b of the first substrate 110. The second substrate 140 has a lower surface 140a and an upper surface 140b. The second shielding layer 160 is located on the upper surface 140b of the second substrate 140, and the second optical film 180 is located on the lower surface 140a of the second substrate 140. In brief, alternatively, the first optical film 130, the first substrate 110, the first shielding layer 120, the display medium 150, the active array layer AL (shown in FIG. 6) that includes the second shielding layer 160 and the active array (shown in FIG. 6), the second substrate 140, and the second optical film 180 can be sequentially arranged along a direction d. However, the invention is not limited to the above descriptions; in another embodiment of the invention, the first shielding layer 120 and the second shielding layer 160 may be arranged at other appropriate locations according to actual requirements.

In the present embodiment, if the display apparatus 100 is to display a color picture, and if the display medium 150 (e.g., liquid crystal or other appropriate materials) cannot emit color light, the display panel 100 further includes a color filter layer 190. However, the invention is not limited thereto; in other embodiments of the invention, if the display apparatus 100 does not intend to display any color picture, the display medium 150 (e.g., an organic electroluminescent layer or other appropriate materials) is capable of emitting color light, or the display medium 150 is not capable of emitting color light but the display apparatus 100 includes a color sequential backlight module capable of providing plural color beams to the display medium 150, the display apparatus 100 may not be equipped with the color filter layer 190.

With reference to FIG. 1, in the present embodiment, the color filter layer 190 can be selectively arranged on the first substrate 110. Namely, the color filter layer 190 can be arranged between the first substrate 110 and the display medium 150. With reference to FIG. 1 and FIG. 3, the first substrate 110, a black matrix BM that includes the first shielding layer 120, and the color filter layer 190 may constitute a color filter substrate. With reference to FIG. 1 and FIG. 6, the active array layer AL (that includes the second shielding layer 160 and the active array 170 having the pixel units 172) may be selectively arranged on the second substrate 140. That is, the active array layer AL may be selectively arranged between the display medium 150 and the second substrate 140, and the second substrate 140 and the active array layer AL can constitute the active array substrate. However, the invention is not limited thereto; in another embodiment, the color filter layer 190 can be selectively arranged on the second substrate 140 (or between the display medium 150 and the second substrate 140), such that the second substrate 140, the active array layer AL, and the color filter layer 190 constitute a color filter on array (COA) substrate.

With reference to FIG. 2, FIG. 3, FIG. 5, and FIG. 6, in the present embodiment, the first substrate 110 and the second substrate 140 are shaped in a rotationally symmetrical manner. For instance, the first substrate 110 and the second substrate 140 are circular, for instance. However, the invention is not limited to the above descriptions; in another embodiment of the invention, at least one of the first substrate 110 and the second substrate 140 is shaped in a rotationally symmetrical manner and may be respectively shaped as a right triangle, a right pentagon, a right hexagon, etc. In the present embodiment of the invention, the first substrate 110 is a flexible substrate, and so is the second substrate 140 (if any), for instance. The flexible substrate is made of an organic polymer or any other appropriate material. However, the invention is not limited to the above descriptions; in another embodiment of the invention, the first substrate 110 and the second substrate 140 may be a rigid substrate or a combination of a rigid substrate and a flexible substrate, for instance. The rigid substrate is made of glass, quartz, a ceramic material, or any other appropriate material. In the present embodiment, the display medium 150 is liquid crystal, for instance. However, the invention is not limited to the above descriptions; in another embodiment of the invention, the display medium 150 may be an electrophoretic display medium, an organic electroluminescent layer, or any other appropriate material.

With reference to FIG. 2 and FIG. 3, in the present embodiment, the first shielding layer 120 is a portion of the black matrix BM (shown in FIG. 3), and the first optical film 130 is a polarization film having an optical axis X1 (e.g., an absorption axis shown in FIG. 2), for instance. Since the first shielding layer 120 and a meshed shielding pattern 122 that serves to shield gaps g (shown in FIG. 6) among the pixel units 172 belong to the same film layer (i.e., the black matrix BM), it is not necessary to additionally form the first shielding layer 120. In the present embodiment, the first shielding layer 120 may be designed as a circular ring-shaped pattern in response to the shape of the first substrate 110 and may correspond to the edge 110c of the first substrate 110. The first shielding layer 120 provided in the present embodiment may cover the edge 110c of the first substrate 110. However, the invention is not limited thereto; in another embodiment of the invention, there may be a distance between the first shielding layer 120 and the edge 110c of the first substrate 110, i.e., the edge of the first shielding layer 120 is shrunk inwardly as compared with the edge 110c of the first substrate 110.

With reference to FIG. 1 and FIG. 3, the black matrix BM includes not only the first shielding layer 120 but also the meshed shielding pattern 122 surrounded by the first shielding layer 120. The meshed shielding pattern 122 shields gaps g among the pixel units 172. That is, the meshed shielding pattern 122 is arranged corresponding to a plurality of data lines (not shown) and a plurality of scan lines (not shown) of the active array layer AL (shown in FIG. 6). Plural openings 122a defined by the meshed shielding pattern 122 are filled with the color filter layer 190. The openings 122a of the meshed shielding pattern 122 expose a plurality of pixel electrodes (not shown) of the pixel units 172. In the present embodiment, the first shielding layer 120 may be made of black resin. However, the invention is not limited to the above descriptions; in another embodiment of the invention, the first shielding layer 120 may be made of metal (e.g., chromium) or other appropriate materials.

With reference to FIG. 2, FIG. 3, and FIG. 4, it should be mentioned that the first shielding layer 120 has a first alignment pattern 124, and the first optical film 130 has a second alignment pattern 132 on a side edge 130a of the first optical film 130. Here, the relative position of the second alignment pattern 132 and the optical axis X1 remains unchanged. The alignment process is performed by arranging the first and second alignment patterns 124 and 132 to be overlapped with each other, so as to prevent apparent misalignment while the first optical film 130 is being fixed to the first substrate 110. For instance, in the present embodiment, the first alignment pattern 124 of the first shielding layer 120 may be a recess, and the second alignment pattern 132 of the first optical film 130 may be a protrusion. If an orthogonal projection of the second alignment pattern 132 (e.g., a protrusion) on the first substrate 110 falls within an orthogonal projection of the first alignment pattern 124 (e.g., a recess) on the first substrate 110, it can be certain that the first optical film 130 is correctly positioned onto the first substrate 110. At this time, an included angle between the direction of the optical axis X1 of the first optical film 130 and the alignment direction of the display medium 150 (e.g., liquid crystal, shown in FIG. 1) falls within a predetermined range, such that superior initial optical characteristics of the display apparatus 100 can be ensured.

In particular, if the first optical film 130 is accurately positioned and fixed onto the first substrate 110, there is a first standard gap between an edge of the first alignment pattern 124 of the first shielding layer 120 and an edge of the second alignment pattern 132 of the first optical film 130. With reference to FIG. 2 and FIG. 4, in the present embodiment, if the first optical film 130 is fixed to the first substrate 110 by manufacturers, the first alignment pattern 124 and the second alignment pattern 132 are overlapped with each other, and a gap H1 (shown in FIG. 2) is between the edge of the first alignment pattern 124 and the edge of the second alignment pattern 132. Through comparing the difference between the gap H1 and the first standard gap, manufacturers are able to determine how the optical axis X1 of the first optical film 130 shifts.

For instance, the first alignment pattern 124 of the first shielding layer 120 may be a recess which has two sides 124a and 124b. The second alignment pattern 132 of the first optical film 130 may be a protrusion which has two sides 132a and 132b. The minimum distance between an orthogonal projection of the side 132a of the second alignment pattern 132 on the first substrate 110 and an orthogonal projection of the side 124a of the first alignment pattern 124 on the first substrate 110 is D1. The minimum distance between an orthogonal projection of the side 132b of the second alignment pattern 132 on the first substrate 110 and an orthogonal projection of the side 124b of the first alignment pattern 124 on the first substrate 110 is D2. If the first optical film 130 is fixed onto the first substrate 110 in an accurate manner, the minimum distance D1 is equal to the minimum distance D2. If the first optical film 130 slightly shifts, whether the optical axis X1 of the first optical film 130 shifts in a clockwise direction or in a counter-clockwise direction can be learned by comparing the minimum distances D1 and D2. Specifically, if the minimum distance D2 is shorter than the minimum distance D1, it can be concluded that the optical axis X1 of the first optical film 130 shifts in a clockwise direction; if the minimum distance D1 is shorter than the minimum distance D2, it can be concluded that the optical axis X1 of the first optical film 130 shifts in a counter-clockwise direction. However, the invention is not limited thereto; in other embodiments, manufacturers can still determine how the optical axis X1 of the first optical film 130 shifts through comparing the difference between the gap H1 and the first standard gap in other different manner.

With reference to FIG. 5 and FIG. 6, in the present embodiment, the second shielding layer 160 is a portion of the metal layer, and the second optical film 180 is a polarization film having an optical axis X2 (e.g., an absorption axis), for instance. In the present embodiment, the second shielding layer 160 may be designed as a circular ring-shaped pattern in response to the shape of the second substrate 140, which should however not be construed as a limitation to the invention. The first shielding layer 120 (shown in FIG. 2) may cover the second shielding layer 160. The second shielding layer 160 corresponds to an edge 140c of the second substrate 140. In the present embodiment, there may be a distance k between the second shielding layer 160 and the edge 140c of the second substrate 140. However, the invention is not limited thereto; in another embodiment of the invention, the second shielding layer 160 may cover the edge 140c of the second substrate 140.

In the present embodiment, the second shielding layer 160 may be selectively integrated into the display apparatus 100 and need not be formed by performing any additional manufacturing step. For instance, the second shielding layer 160 may be an electrostatic discharge (ESD) circuit surrounding all of the pixel units 172, a peripheral common electrode providing a reference potential to each pixel unit 172, or other shielding patterns arranged on the second substrate 140. In particular, in order for the manufacturers to observe the third alignment pattern 162 of the second shielding layer 160, the film layer where the second shielding layer 160 belongs is preferably a shielding layer (in the active array layer AL) closest to the second substrate 140. For instance, if the active devices of the pixel units 172 are bottom-gate thin film transistors, the second shielding layer 160 and the gates of the active devices may be selectively formed in the same film layer. Nevertheless, the invention is not limited thereto; in another embodiment of the invention, if the active devices of the pixel units 172 are top-gate thin film transistors, the second shielding layer 160 and the drains and/or the sources of the active devices may be selectively formed in the same film layer. It should be mentioned that the film layer where the second shielding layer 160 belongs in the present embodiment is not necessarily the shielding layer (in the active array layer AL) closest to the second substrate 140; in another embodiment, the second shielding layer 160 including the third alignment pattern 162 may not be arranged in the shielding layer closest to the second substrate 140 through appropriately designing the layout of each shielding layer, i.e., through arranging the shielding layer closest to the second substrate 140 to expose the third alignment pattern 162 away from the second substrate 140.

With reference to FIG. 5 and FIG. 7, the second shielding layer 160 has the third alignment pattern 162, and the second optical film 180 has a fourth alignment pattern 182 on a side edge 180a of the second optical film 180. Here, the relative position of the fourth alignment pattern 182 and the optical axis X2 remains unchanged and known. Similarly, the alignment process is performed by arranging the first and second alignment patterns 162 and 182 to be overlapped with each other, so as to prevent apparent misalignment while the second optical film 180 is being fixed to the second substrate 140. For instance, in the present embodiment, the third alignment pattern 162 of the second shielding layer 160 may be a recess, and the fourth alignment pattern 182 of the second optical film 180 may be a protrusion. If an orthogonal projection of the fourth alignment pattern 182 (e.g., a protrusion) on the second substrate 140 falls within an orthogonal projection of the third alignment pattern 162 (e.g., a recess) on the second substrate 140, it can be certain that the second optical film 180 is correctly positioned and fixed onto the second substrate 140. At this time, an included angle between the direction of the optical axis X2 of the second optical film 180 and the alignment direction of the display medium 150 (e.g., liquid crystal) falls within a predetermined range, such that superior initial optical characteristics of the display apparatus 100 can be ensured.

In particular, if the second optical film 180 is accurately positioned and fixed onto the second substrate 140, there is a second standard gap between an edge of the third alignment pattern 162 of the second shielding layer 160 and an edge of the fourth alignment pattern 182 of the second optical film 180. According to the present embodiment, if the second optical film 180 is fixed to the second substrate 140 by manufacturers, the third alignment pattern 162 and the fourth alignment pattern 182 are overlapped with each other, and a gap H2 (shown in FIG. 5) is between the edge of the third alignment pattern 162 and the edge of the fourth alignment pattern 182. Through comparing the difference between the gap H2 and the second standard gap, manufacturers are able to determine how the optical axis X2 of the second optical film 180 shifts.

For instance, the third alignment pattern 162 of the second shielding layer 160 may be a recess which has two sides 162a and 162b. The fourth alignment pattern 182 of the second optical film 180 may be a protrusion which has two sides 182a and 182b. The minimum distance between an orthogonal projection of the side 182a of the fourth alignment pattern 182 on the second substrate 140 and an orthogonal projection of the side 162a of the third alignment pattern 162 on the second substrate 140 is D3. The minimum distance between an orthogonal projection of the side 182b of the fourth alignment pattern 182 on the second substrate 140 and an orthogonal projection of the side 162b of the third alignment pattern 162 on the second substrate 140 is D4. If the second optical film 180 is fixed onto the second substrate 140 in an accurate manner, the minimum distance D3 is equal to the minimum distance D4. If the second optical film 180 slightly shifts, whether the optical axis X2 of the second optical film 180 shifts in a clockwise direction or in a counter-clockwise direction can be learned by comparing the minimum distances D3 and D4. Specifically, if the minimum distance D4 is shorter than the minimum distance D3, it can be concluded that the optical axis X2 of the second optical film 180 shifts in a clockwise direction; if the minimum distance D3 is shorter than the minimum distance D4, it can be concluded that the optical axis X2 of the second optical film 180 shifts in a counter-clockwise direction. However, the invention is not limited thereto; in other embodiments, manufacturers can still determine how the optical axis X2 of the second optical film 180 shifts through comparing the difference between the gap H2 and the second standard gap in other different manner.

In the present embodiment, the display apparatus 100 is a twisted nematic (TN) liquid crystal display (LCD), a vertical alignment (VA) LCD, or an advanced hyper-viewing angle (AHVA) LCD, and the optical axis X1 of the first optical film 130 and the optical axis X2 of the second optical film 180 may be perpendicular to each other. Nevertheless, the invention is not limited thereto; in consideration of different display modes of the display apparatus 100 and/or different ways to tune the optical characteristics of the display apparatus 100, the included angle between the optical axis X1 of the first optical film 130 and the optical axis X2 of the second optical film 180 may also be designed in another appropriate manner. For instance, if the display apparatus 100 is an electrically controlled birefringence (ECB) LCD, the optical axis X1 of the first optical film 130 and the optical axis X2 of the second optical film 180 may be parallel to each other.

In the previous embodiments, the first optical film 130 and the second optical film 180 are polarization films, for instance; however, in other embodiments, the first optical film 130 and the second optical film 180 may be other types of optical films which are required to be accurately positioned and fixed onto the first substrate 110 and the second substrate 140, such as brightness enhancement films, touch sensing films, and so forth. Moreover, the shape of the first alignment pattern 124, the shape of the second alignment pattern 132, the shape of the third alignment pattern 162, and the shape of the fourth alignment pattern 182 serve to explain the invention but should not be construed as limitations to the invention. In another embodiment, the first alignment pattern 124, the second alignment pattern 132, the third alignment pattern 162, and the fourth alignment pattern 182 can be shaped in other appropriate manner, which will be exemplified in the following embodiments.

Figure 8:
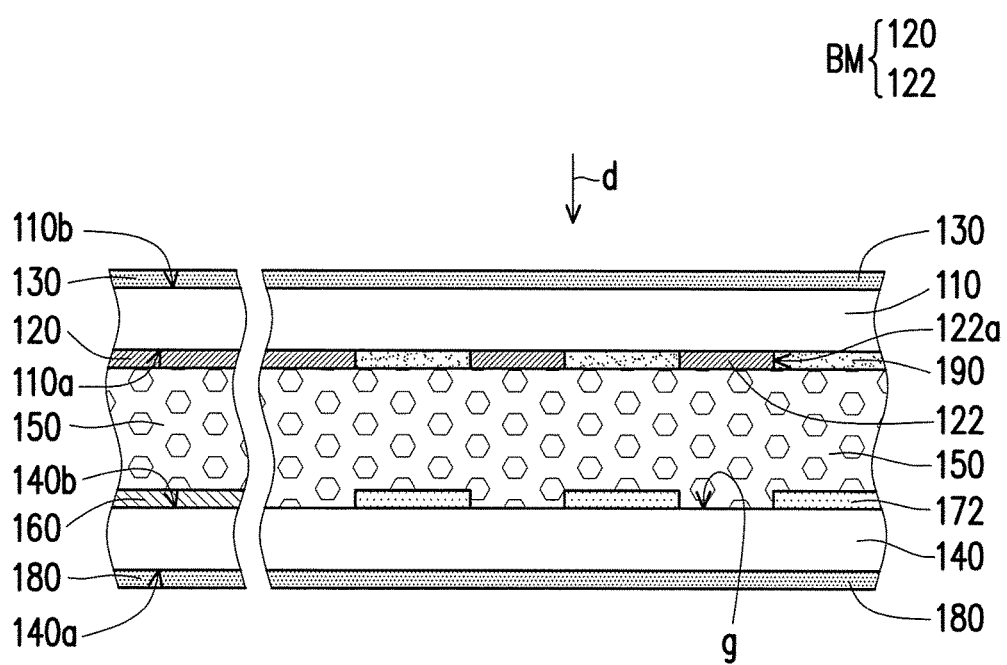
FIG. 8 is a schematic cross-sectional view illustrating a display apparatus according to another embodiment of the invention.
Figure 9:
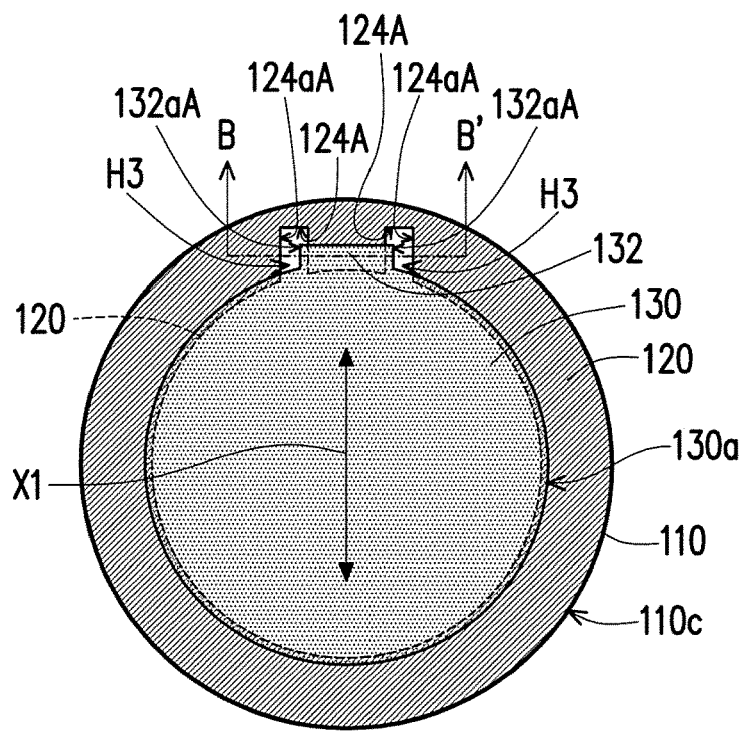
FIG. 9 is a schematic top view illustrating the first optical film, the first substrate, and the first shielding layer of the display apparatus depicted in FIG. 8.
Figure 10:
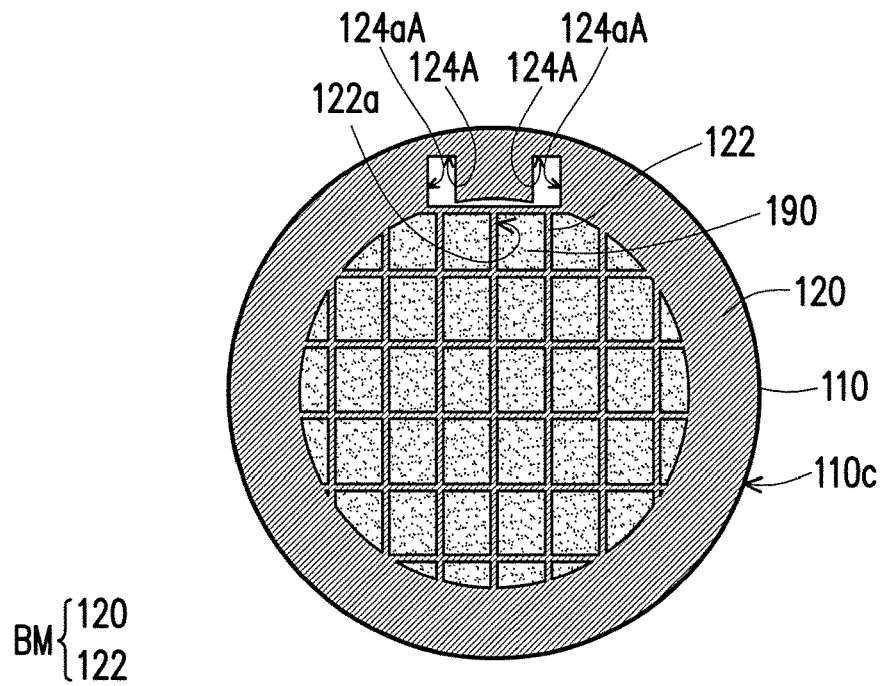
FIG. 10 is a schematic top view illustrating the first substrate, the first shielding layer, and a meshed shielding pattern of the display apparatus depicted in FIG. 8.
Figure 11:
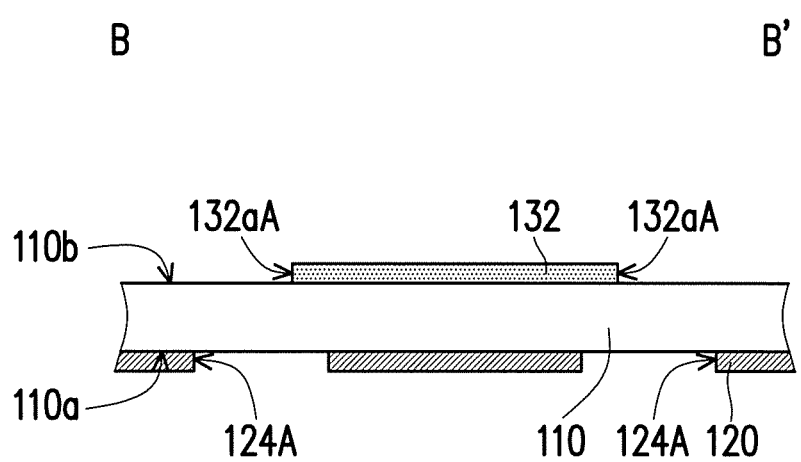
FIG. 11 is a schematic cross-sectional view illustrating the first optical film, the first substrate, and the first shielding layer taken along a section line B-B' depicted in FIG. 9.
Figure 12:
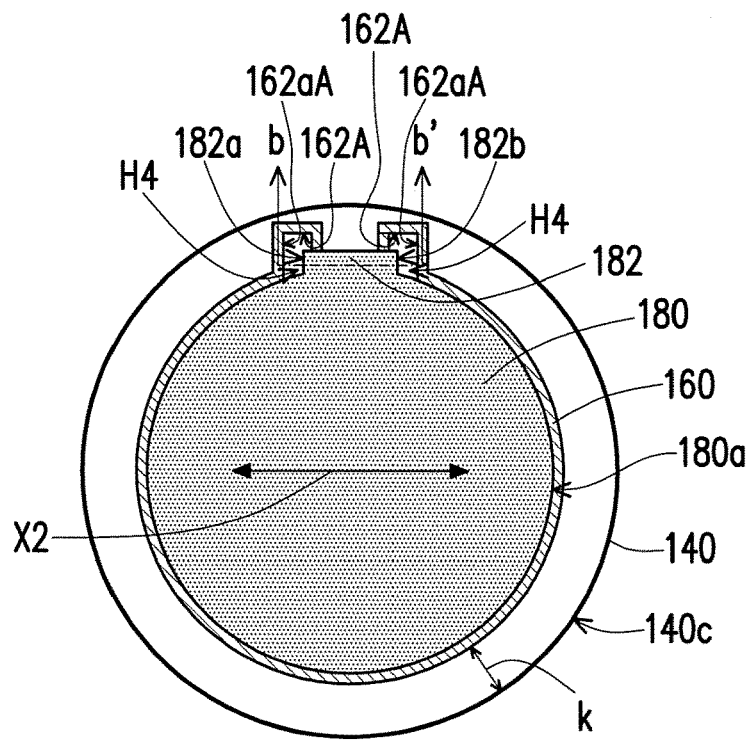
FIG. 12 is a schematic top view illustrating the second optical film, the second substrate, and the second shielding layer of the display apparatus depicted in FIG. 8.
Figure 13:
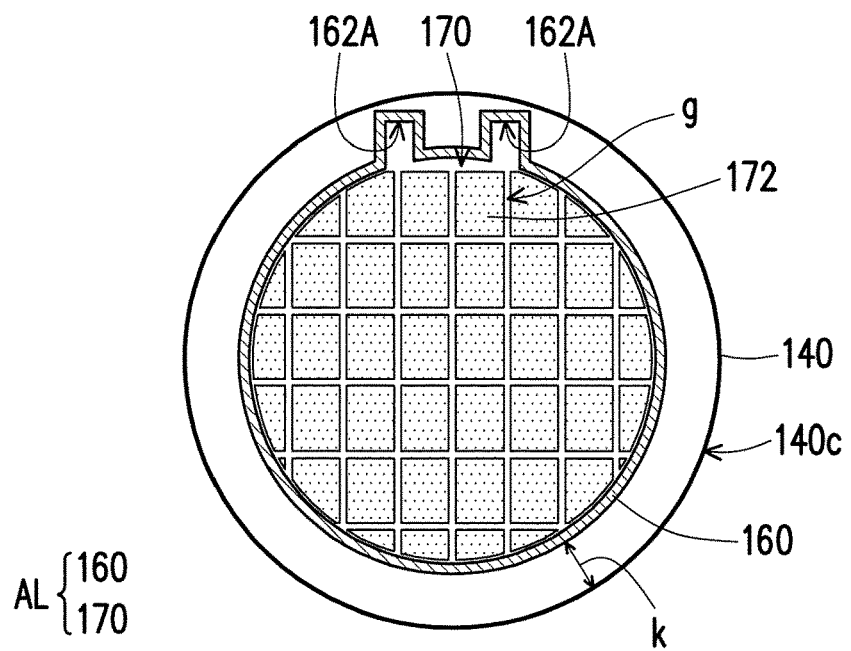
FIG. 13 is a schematic top view illustrating the second substrate and the second shielding layer of the display apparatus depicted in FIG. 8.
Figure 14:
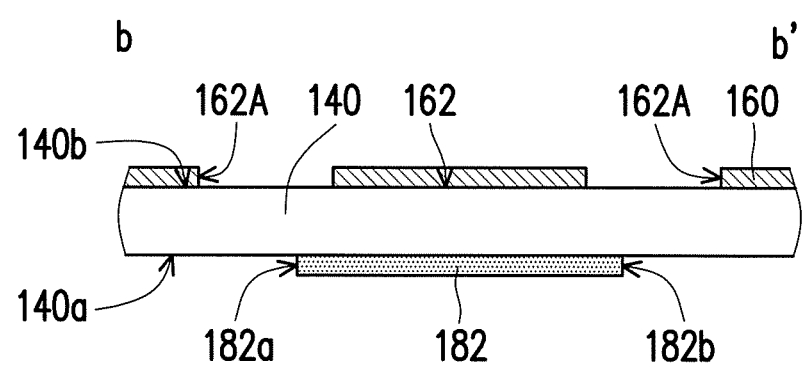
FIG. 14 is a schematic cross-sectional view illustrating the second optical film, the second substrate, and the second shielding layer taken along a section line b-b' depicted in FIG. 12.

FIG. 8 is a schematic cross-sectional view illustrating a display apparatus according to another embodiment of the invention. FIG. 9 is a schematic top view illustrating the first optical film, the first substrate, and the first shielding layer of the display apparatus depicted in FIG. 8. FIG. 10 is a schematic top view illustrating the first substrate, the first shielding layer, and a meshed shielding pattern of the display apparatus depicted in FIG. 8. FIG. 11 is a schematic cross-sectional view illustrating the first optical film, the first substrate, and the first shielding layer taken along a section line B-B' depicted in FIG. 9. FIG. 12 is a schematic top view illustrating the second optical film, the second substrate, and the second shielding layer of the display apparatus depicted in FIG. 8. FIG. 13 is a schematic top view illustrating the second substrate and the second shielding layer of the display apparatus depicted in FIG. 8. FIG. 14 is a schematic cross-sectional view illustrating the second optical film, the second substrate, and the second shielding layer taken along a section line b-b' depicted in FIG. 12. The display apparatus 100A is described hereinafter with reference to FIG. 8 to FIG. 14.

The display apparatus 100A described in the present embodiment is similar to the display apparatus 100 described above, and therefore the same or similar components are labeled by the same reference numbers. The main difference between the display apparatus 100A and the display apparatus 100 lies in the first alignment pattern 124A and the third alignment pattern 162A of the display apparatus 100A, as compared to the first alignment pattern 124 and the third alignment pattern 162 of the display apparatus 100. Such difference will be explained below, while the similarities may be deduced from the descriptions provided above and the illustration in FIG. 8-FIG. 14 and thus will not be further explained hereinafter.

With reference to FIG. 8 and FIG. 9, the display apparatus 100A includes the first substrate 110, the first shielding layer 120 located on the first substrate 110 and equipped with the first alignment pattern 124A, the first optical film 130 located on the first substrate 110 and equipped with the second alignment pattern 132 on the side edge 130a of the first optical film 130, the second substrate 140 located opposite to the first substrate 110, and the display medium 150 between the first substrate 110 and the second substrate 140. The first alignment pattern 124A and the second alignment pattern 132 are overlapped with each other, so as to correctly position and secure the first optical film 130 onto the first substrate 110.

With reference to FIG. 8 and FIG. 12, the display apparatus 100A further includes the second shielding layer 160 and the second optical film 180. The second shielding layer 160 and the second optical film 180 are located on the second substrate 140, and the second shielding layer 160 has the third alignment pattern 162A. The second optical film 180 has the fourth alignment pattern 182 on a side edge 180a of the second optical film 180. The third alignment pattern 162A and the fourth alignment pattern 182 are overlapped with each other, so as to correctly position and secure the second optical film 180 onto the second substrate 140.

With reference to FIG. 9, FIG. 10, and FIG. 11, one of the differences between the display apparatus 100 and the display apparatus 100A lies in that the first alignment pattern 124A of the display apparatus 100A is two openings inside the first shielding layer 120, and the two openings are symmetrical to each other and are separated. If the orthogonal projection of two edges 132aA of the second alignment pattern 132 on the first substrate 110 are both located in the orthogonal projection of the first alignment pattern 124A (i.e., two openings) on the first substrate 110, it is certain that the included angle between the direction of the optical axis X1 of the first optical film 130 and the alignment direction of the display medium 150 (e.g., liquid crystal) falls within a predetermined range, such that superior initial optical characteristics of the display apparatus 100A can be ensured.

To be specific, according to the present embodiment, the first alignment patterns 124A and the second alignment pattern 132 are overlapped, such that two gaps H3 (shown in FIG. 9) are respectively between the edge 124aA (shown in FIG. 9) of each first alignment pattern 124A and the edges 132aA of the second alignment pattern 132. Through comparing the difference between the two gaps H3, manufacturers are able to determine how the optical axis X1 of the first optical film 130 shifts. Specifically, if the area of the right gap H3 is smaller than the area of the left gap H3, it can be concluded that the optical axis X1 of the first optical film 130 shifts in a clockwise direction; if the area of the left gap H3 is smaller than the area of the right gap H3, it can be concluded that the optical axis X1 of the first optical film 130 shifts in a counter-clockwise direction. However, the invention is not limited thereto; in other embodiments, manufacturers can still determine how the optical axis X1 of the first optical film 130 shifts through comparing the difference between the two gaps H3 in other different manner.

With reference to FIG. 12, FIG. 13, and FIG. 14, another difference between the display apparatus 100 and the display apparatus 100A lies in that the third alignment pattern 162A of the display apparatus 100A is two recesses of the second shielding layer 160. If the orthogonal projection of two edges 182a and 182b of the fourth alignment pattern 182 on the second substrate 140 are both located in the orthogonal projection of the third alignment patterns 162A (i.e., two recesses) on the second substrate 140, it is certain that the included angle between the direction of the optical axis X2 of the second optical film 180 and the alignment direction of the display medium 150 (e.g., liquid crystal) falls within a predetermined range, such that superior initial optical characteristics of the display apparatus 100A can be ensured.

To be specific, according to the present embodiment, the two recesses of the third alignment patterns 162A and the fourth alignment pattern 182 are overlapped, such that a gap H4 (shown in FIG. 12) is formed between the edge 162aA of each third alignment pattern 162A and the edge of the fourth alignment pattern 182. Similarly, through comparing the difference between the left and right gaps H4, manufacturers are able to determine how the optical axis X2 of the second optical film 180 shifts. For instance, if the area of the right gap H4 is smaller than the area of the left gap H4, it can be concluded that the optical axis X2 of the second optical film 180 shifts in a clockwise direction; if the area of the left gap H4 is smaller than the area of the right gap H4, it can be concluded that the optical axis X2 of the second optical film 180 shifts in a counter-clockwise direction. However, the invention is not limited thereto; in other embodiments, manufacturers can still determine how the optical axis X2 of the second optical film 180 shifts through comparing the difference between the two gaps H4 in other different manner. Since the effects that can be accomplished by the display apparatus 100A are similar to those achieved by the display apparatus 100, no further descriptions in this regard are provided hereinafter.

Figure 15:
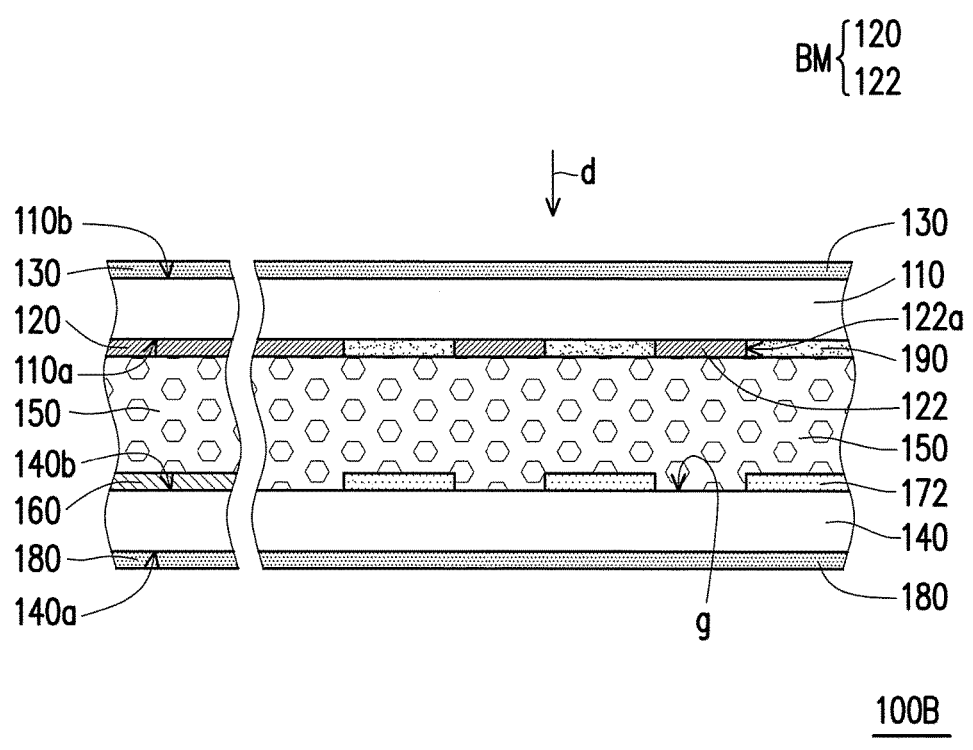
FIG. 15 is a schematic cross-sectional view illustrating a display apparatus according to yet another embodiment of the invention.
Figure 16:
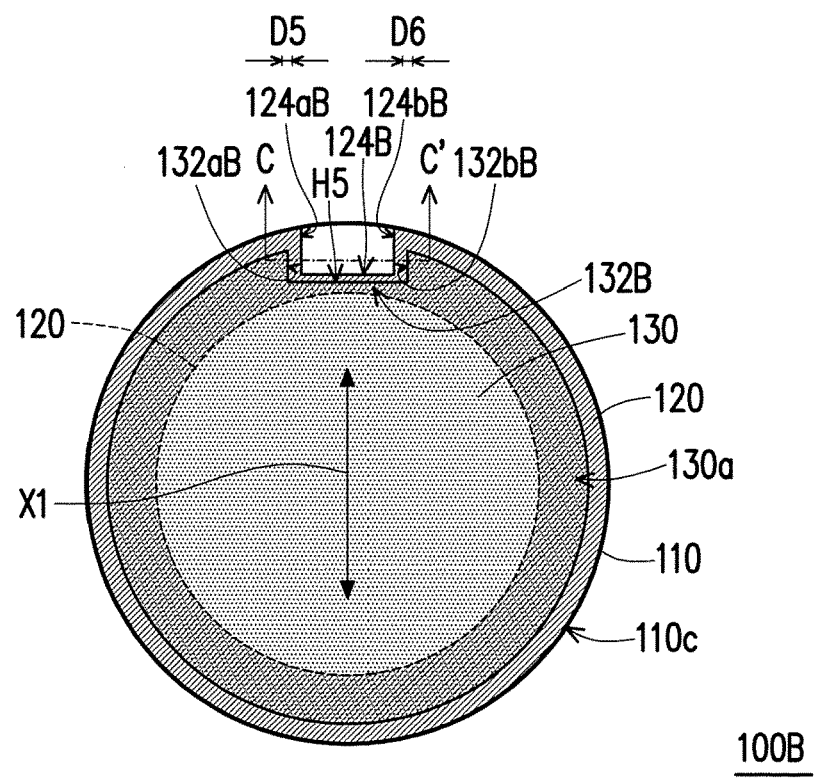
FIG. 16 is a schematic top view illustrating the first optical film, the first substrate, and the first shielding layer of the display apparatus depicted in FIG. 15.
Figure 17:
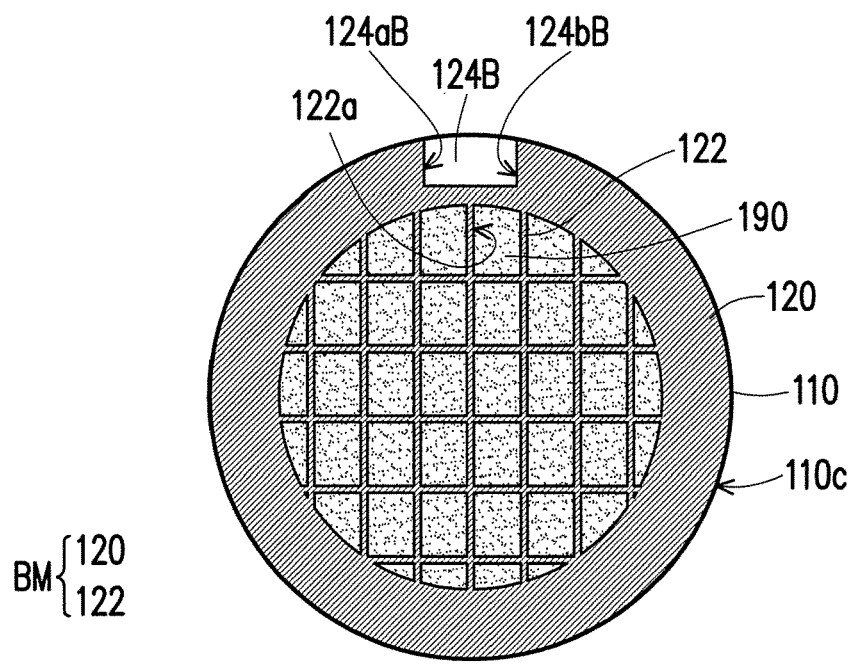
FIG. 17 is a schematic top view illustrating the first substrate, the first shielding layer, and a meshed shielding pattern of the display apparatus depicted in FIG. 15.
Figure 18:
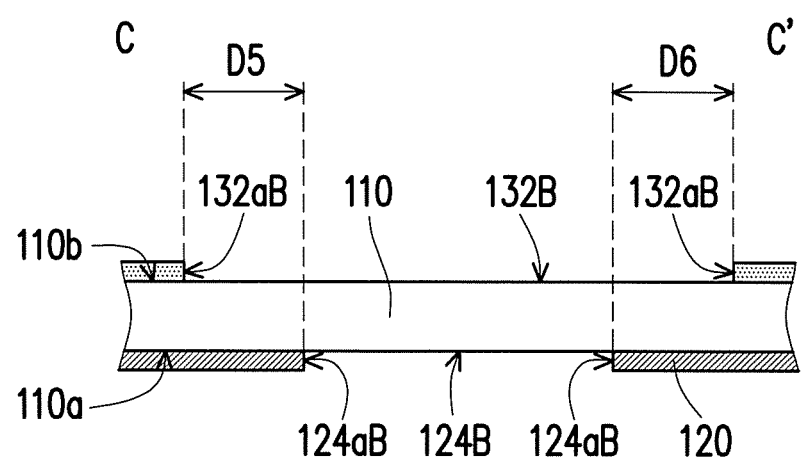
FIG. 18 is a schematic cross-sectional view illustrating the first optical film, the first substrate, and the first shielding layer taken along a section line C-C' depicted in FIG. 16.
Figure 19:
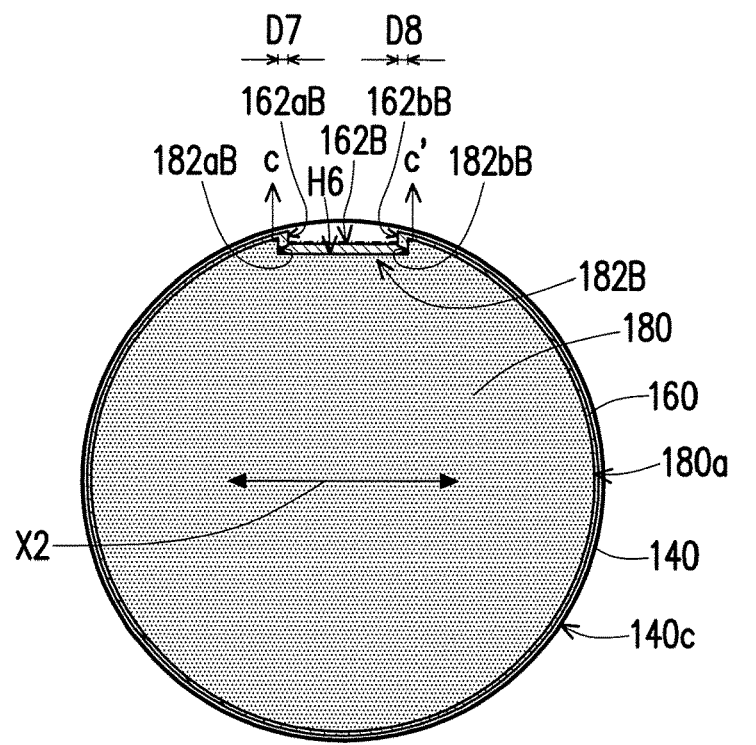
FIG. 19 is a schematic top view illustrating the second optical film, the second substrate, and the second shielding layer of the display apparatus depicted in FIG. 15.
Figure 20:
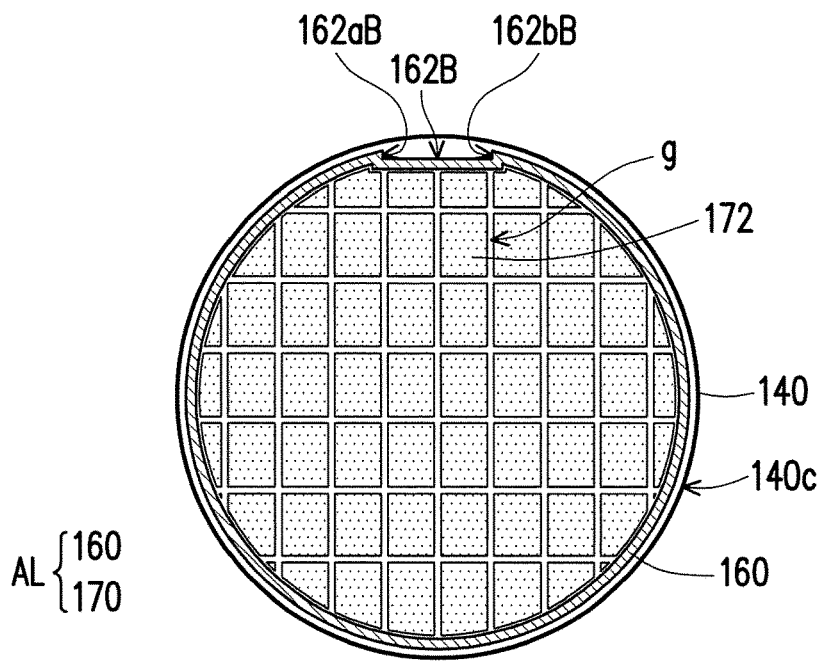
FIG. 20 is a schematic top view illustrating the second substrate and the second shielding layer of the display apparatus depicted in FIG. 15.
Figure 21:
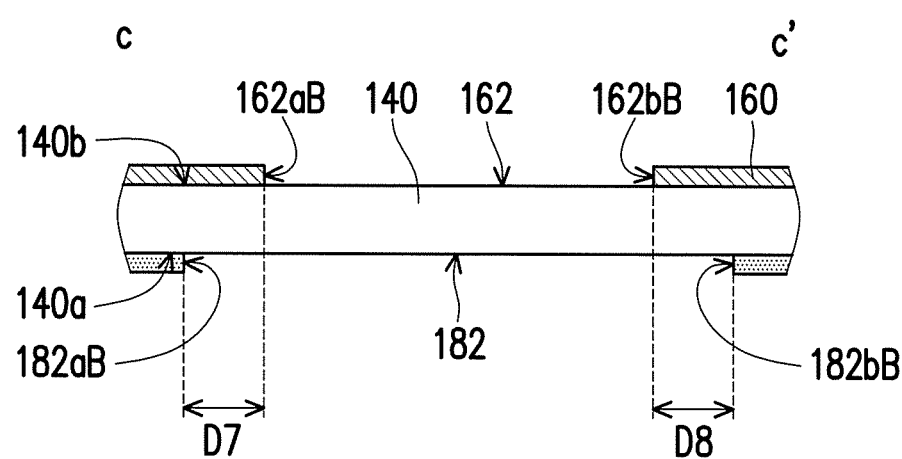
FIG. 21 is a schematic cross-sectional view illustrating the second optical film, the second substrate, and the second shielding layer taken along a section line c-c' depicted in FIG. 19.

FIG. 15 is a schematic cross-sectional view illustrating a display apparatus according to yet another embodiment of the invention. FIG. 16 is a schematic top view illustrating the first optical film, the first substrate, and the first shielding layer of the display apparatus depicted in FIG. 15. FIG. 17 is a schematic top view illustrating the first substrate, the first shielding layer, and a meshed shielding pattern of the display apparatus depicted in FIG. 15. FIG. 18 is a schematic cross-sectional view illustrating the first optical film, the first substrate, and the first shielding layer taken along a section line C-C' depicted in FIG. 16. FIG. 19 is a schematic top view illustrating the second optical film, the second substrate, and the second shielding layer of the display apparatus depicted in FIG. 15. FIG. 20 is a schematic top view illustrating the second substrate and the second shielding layer of the display apparatus depicted in FIG. 15. FIG. 21 is a schematic cross-sectional view illustrating the second optical film, the second substrate, and the second shielding layer taken along a section line c-c' depicted in FIG. 19. The display apparatus 100B is described hereinafter with reference to FIG. 15 to FIG. 21.

The display device 100B described in the present embodiment is similar to the display device 100 described above, and therefore the same or similar components are labeled by the same reference numbers. The main difference between the display apparatus 100B and the display apparatus 100 lies in the first alignment pattern 124B, the second alignment pattern 132B, the third alignment pattern 162B, and the fourth alignment pattern 182B of the display apparatus 100B, as compared to the first alignment pattern 124, the second alignment pattern 132, the third alignment pattern 162, and the fourth alignment pattern 182 of the display apparatus 100. Such difference will be explained below, while the similarities may be deduced from the descriptions provided above and the illustration in FIG. 15-FIG. 21 and thus will not be further explained hereinafter.

With reference to FIG. 15 and FIG. 16, the display apparatus 100B includes the first substrate 110, the first shielding layer 120 located on the first substrate 110 and equipped with the first alignment pattern 124B, the first optical film 130 located on the first substrate 110 and equipped with the second alignment pattern 132B on the side edge 130a of the first optical film 130, the second substrate 140 located opposite to the first substrate 110, and the display medium 150 between the first substrate 110 and the second substrate 140. The first alignment pattern 124B and the second alignment pattern 132B are overlapped with each other, so as to correctly position and secure the first optical film 130 onto the first substrate 110.

With reference to FIG. 15 and FIG. 19, the display apparatus 100B further includes the second shielding layer 160 and the second optical film 180. The second shielding layer 160 and the second optical film 180 are located on the second substrate 140, and the second shielding layer 160 has the third alignment pattern 162B. The second optical film 180 has the fourth alignment pattern 182B on a side edge 180a of the second optical film 180. The third alignment pattern 162B and the fourth alignment pattern 182B are overlapped with each other, so as to correctly position and secure the second optical film 180 onto the second substrate 140.

With reference to FIG. 16, FIG. 17, and FIG. 18, unlike the display apparatus 100, the display apparatus 100B has the first alignment pattern 124B (which is an indentation on the side edge of the first shielding layer 120) and the second alignment pattern 132B (which is an indentation on the side edge of the first optical film 130), and the second alignment pattern 132B (the indentation) of the first optical film 130 is greater than the first alignment pattern 124B (the indentation) of the first shielding layer 120. If the second alignment pattern 132B (the indentation) of the first optical film 130 surrounds the first alignment pattern 124B (the indentation) of the first shielding layer 120, the second alignment pattern 132B (the indentation) of the first optical film 130 and the first alignment pattern 124B (the indentation) of the first shielding layer 120 face the same direction; if the first alignment pattern 124B (the indentation) of the first shielding layer 120 is not covered by the first optical film 130, it is certain that an included angle between the direction of the optical axis X1 of the first optical film 130 and the alignment direction of the display medium 150 (e.g., liquid crystal) falls within a predetermined range, such that superior initial optical characteristics of the display apparatus 100B can be ensured.

To be specific, given that the first optical film 130 is accurately positioned and fixed onto the first substrate 110, there is a third standard gap between an edge of the first alignment pattern 124B of the first shielding layer 120 and an edge of the second alignment pattern 132B of the first optical film 130. According to the present embodiment, if the first optical film 130 is fixed to the first substrate 110 by manufacturers, the first alignment pattern 124B and the second alignment pattern 132B are overlapped with each other, and a gap H5 (shown in FIG. 16) is between the edge of the first alignment pattern 124B and the edge of the second alignment pattern 132B. Through comparing the difference between the gap H5 and the third standard gap, manufacturers are able to determine how the optical axis X1 of the first optical film 130 shifts.

With reference to FIG. 16 and FIG. 18, for instance, the first alignment pattern 124B of the first shielding layer 120 may be an indentation shaped as "U" with two sides 124aB and 124bB. The second alignment pattern 132B of the first optical film 130 may also be an indentation shaped as "U" with two sides 132aB and 132bB. The minimum distance between an orthogonal projection of the side 132aB of the second alignment pattern 132B on the first substrate 110 and an orthogonal projection of the side 124aB of the first alignment pattern 124B on the first substrate 110 is D5, and the minimum distance between the side 132bB of the second alignment pattern 132B and the side 124bB of the first alignment pattern 124B is D6. If the first optical film 130 is fixed onto the first substrate 110 in an accurate manner, the minimum distance D5 is equal to the minimum distance D6. If the first optical film 130 slightly shifts, whether the optical axis X1 of the first optical film 130 shifts in a clockwise direction or in a counter-clockwise direction can be learned by comparing the minimum distances D5 and D6. Specifically, if the minimum distance D5 is shorter than the minimum distance D6, it can be concluded that the optical axis X1 of the first optical film 130 shifts in a clockwise direction; if the minimum distance D6 is shorter than the minimum distance D5, it can be concluded that the optical axis X1 of the first optical film 130 shifts in a counter-clockwise direction. However, the invention is not limited thereto; in other embodiments, manufacturers can still determine how the optical axis X1 of the first optical film 130 shifts through comparing the difference between the gap H5 and the third standard gap in other different manner.

With reference to FIG. 19, FIG. 20, and FIG. 21, different from the display apparatus 100, the display apparatus 100B has the third alignment pattern 162B (which is an indentation on the side edge of the second shielding layer 160) and the fourth alignment pattern 182B (which is an indentation on the side edge of the second optical film 180), and the fourth alignment pattern 182B (the indentation) of the second optical film 180 is greater than the third alignment pattern 162B (the indentation) of the second shielding layer 160. If the fourth alignment pattern 182B (the indentation) of the second optical film 180 surrounds the third alignment pattern 162B (the indentation) of the second shielding layer 160, and the third alignment pattern 162B (the indentation) of the second shielding layer 160 is not covered by the second optical film 180, it is certain that an included angle between the direction of the optical axis X2 of the second optical film 180 and the alignment direction of the display medium 150 (e.g., liquid crystal) falls within a predetermined range, such that superior initial optical characteristics of the display apparatus 100B can be ensured.

To be specific, given that the second optical film 180 is accurately positioned and fixed onto the second substrate 140, there is a fourth standard gap between an edge of the third alignment pattern 162B of the second shielding layer 160 and an edge of the fourth alignment pattern 182B of the second optical film 180. According to the present embodiment, if the second optical film 180 is fixed to the second substrate 140 by manufacturers, the third alignment pattern 162B and the fourth alignment pattern 182B are overlapped with each other, and a gap H6 (shown in FIG. 19) is between the edge of the third alignment pattern 162B and the fourth alignment pattern 182B. Through comparing the difference between the gap H6 and the fourth standard gap, manufacturers are able to determine how the optical axis X2 of the second optical film 180 shifts.

With reference to FIG. 19 and FIG. 21, for instance, the third alignment pattern 162B of the second shielding layer 160 may be an indentation shaped as "U" with two sides 162aB and 162bB. The fourth alignment pattern 182B of the second optical film 180 may also be an indentation shaped as a letter U with two sides 182aB and 182bB. The minimum distance between the side 182aB of the fourth alignment pattern 182B and the side 162aB of the third alignment pattern 162B is D7, and the minimum distance between the side 182bB of the fourth alignment pattern 182B and the side 162bB of the third alignment pattern 162B is D8. If the second optical film 180 is fixed onto the second substrate 140 in an accurate manner, the minimum distance D7 is equal to the minimum distance D8. If the second optical film 180 slightly shifts, whether the optical axis X2 of the second optical film 180 shifts in a clockwise direction or in a counter-clockwise direction can be learned by comparing the minimum distances D7 and D8. Specifically, if the minimum distance D7 is shorter than the minimum distance D8, it can be concluded that the optical axis X2 of the second optical film 180 shifts in a clockwise direction; if the minimum distance D8 is shorter than the minimum distance D7, it can be concluded that the optical axis X2 of the second optical film 180 shifts in a counter-clockwise direction. However, the invention is not limited thereto; in other embodiments, manufacturers can still determine how the optical axis X2 of the second optical film 180 shifts through comparing the difference between the gap H6 and the fourth standard gap in other different manner. Since the effects that can be accomplished by the display apparatus 100B are similar to those achieved by the display apparatus 100, no further descriptions in this regard are provided hereinafter.

To sum up, in the display apparatus provided in an embodiment of the invention, the first alignment pattern of the first shielding layer and the second alignment pattern of the first optical film are overlapped with each other, and thereby the issue of the deteriorated optical characteristics of the display apparatus caused by fixing the first optical film onto the first substrate in an incorrect manner can be resolved.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A display apparatus comprising:
   a first circular substrate;
   a first shielding layer located on the first circular substrate, the first shielding layer having a first alignment pattern;
   a first polarization film located on the first circular substrate, an outer contour of the first polarization film having a second alignment pattern, wherein the outer contour of the first polarization film is a circular ring-shaped, wherein the first alignment pattern and the second alignment pattern are overlapped with each other; and
   a second circular substrate located opposite to the first circular substrate.

2. The display apparatus according to claim 1, wherein the first shielding layer comprises a circular ring-shaped pattern corresponding to the outer edge contour of the first polarization film.

3. The display apparatus according to claim 1, further comprising:

a second shielding layer located on the second circular substrate, the second shielding layer having a third alignment pattern; and a second polarization film located on the second circular substrate, the second polarization film having a fourth alignment pattern, wherein the third alignment pattern and the fourth alignment pattern are overlapped with each other so that an optical axis of the first polarization film is perpendicular or parallel to an optical axis of the second polarization film.

4. The display apparatus according to claim 1, wherein the first alignment pattern is a first recess, wherein the second alignment pattern is a first protrusion, and wherein how an optical axis of the first polarization film shifts is determined through comparing the difference between a first standard gap and a gap formed between an edge of the first recess and an edge of the first protrusion.

5. The display apparatus according to claim 4, wherein a minimum distance between an orthogonal projection of a first side of the first protrusion on the first circular substrate and an orthogonal projection of a first side of the first recess on the first circular substrate is D1, wherein a minimum distance between an orthogonal projection of a second side of the first protrusion on the first circular substrate and an orthogonal projection of a second side of the first recess on the first circular substrate is D2, and wherein D1 is approximately equal to D2.

6. The display apparatus according to claim 5, further comprising:
a second shielding layer located on the second circular substrate, the second shielding layer having a third alignment pattern, wherein the third alignment pattern is a second recess; and
a second polarization film located on the second circular substrate, the second polarization film having a fourth alignment pattern, wherein the fourth alignment pattern is a second protrusion, wherein the second recess and the second protrusion are overlapped with each other, wherein a minimum distance between an orthogonal projection of a first side of the second protrusion on the second circular substrate and an orthogonal projection of a first side of the second recess on the second circular substrate is D3, wherein a minimum distance between an orthogonal projection of a second side of the second protrusion on the second circular substrate and an orthogonal projection of a second side of the second recess on the second circular substrate is D4, and wherein D3 is approximately equal to D4.

7. The display apparatus according to claim 1, wherein the first alignment pattern has two openings substantially symmetrical to each other, wherein the second alignment pattern is a first protrusion, and wherein a portion of the first protrusion is located between the two openings.

8. The display apparatus according to claim 7, wherein how an optical axis of the first polarization film shifts is determined through comparing the difference between a first gap formed between an edge of the first protrusion and an edge of one of the two openings and a second gap formed between an edge of the first protrusion and an edge of another one of the two openings.

9. The display apparatus according to claim 1, wherein the first alignment pattern is a first recess, wherein the second alignment pattern is a second recess, wherein a minimum distance between an orthogonal projection of a first side of the second recess on the first circular substrate and an orthogonal projection of a first side of the first recess on the first circular substrate is D5, wherein a minimum distance between an orthogonal projection of a second side of the second recess on the first circular substrate and an orthogonal projection of a second side of the first recess on the first circular substrate is D6, and wherein D5 is approximately equal to D6.

10. The display apparatus according to claim 9, further comprising:
a second shielding layer located on the second circular substrate, the second shielding layer having a third alignment pattern, wherein the third alignment pattern is a third recess; and
a second polarization film located on the second circular substrate, the second polarization film having a fourth alignment pattern, wherein the fourth alignment pattern is a fourth recess, wherein the third recess and the fourth recess are overlapped with each other, wherein a minimum distance between an orthogonal projection of a first side of the fourth recess on the second circular substrate and an orthogonal projection of a first side of the third recess on the second circular substrate is D7, wherein a minimum distance between an orthogonal projection of a second side of the fourth recess on the second circular substrate and an orthogonal projection of a second side of the third recess on the second circular substrate is D8, and wherein D7 is approximately equal to D8.

11. The display apparatus according to claim 1, further comprising a display medium sandwiched between the first circular substrate and the second circular substrate.

12. A display apparatus comprising:
a first circular substrate;
a first shielding layer located on the first circular substrate, the first shielding layer having a first alignment pattern;
a first polarization film located on the first circular substrate, an outer contour of the first polarization film having a second alignment pattern, wherein the outer contour of the first polarization film is a circular ring-shaped; and
a second polarization film located opposite to the first polarization film, wherein the first alignment pattern and the second alignment pattern are overlapped with each other so that an optical axis of the first polarization film is perpendicular or parallel to an optical axis of the second polarization film.

13. The display apparatus according to claim 12, wherein the first shielding layer comprises a circular ring-shaped pattern corresponding to the outer edge contour of the first polarization film.

14. The display apparatus according to claim 12, wherein the first alignment pattern is a first recess, wherein the second alignment pattern is a first protrusion, and wherein how an optical axis of the first polarization film shifts is determined through comparing the difference between a first standard gap and a gap formed between an edge of the first recess and an edge of the first protrusion.

15. The display apparatus according to claim 14, wherein a minimum distance between an orthogonal projection of a first side of the first protrusion on the first circular substrate and an orthogonal projection of a first side of the first recess on the first circular substrate is D1, wherein a minimum distance between an orthogonal projection of a second side of the first protrusion on the first circular substrate and an orthogonal projection of a second side of the first recess on the first circular substrate is D2, and wherein D1 is approximately equal to D2.

16. The display apparatus according to claim 12, wherein the first alignment pattern has two openings substantially symmetrical to each other, wherein the second alignment pattern is a first protrusion, and wherein a portion of the first protrusion is located between the two openings.

17. The display apparatus according to claim 16, wherein how an optical axis of the first polarization film shifts is determined through comparing the difference between a first gap formed between an edge of the first protrusion and an edge of one of the two openings and a second gap formed between an edge of the first protrusion and an edge of another one of the two openings.

18. The display apparatus according to claim 12, wherein the first alignment pattern is a first recess, wherein the second alignment pattern is a second recess, wherein a minimum distance between an orthogonal projection of a first side of the second recess on the first circular substrate and an orthogonal projection of a first side of the first recess on the first circular substrate is D5, wherein a minimum distance between an orthogonal projection of a second side of the second recess on the first circular substrate and an orthogonal projection of a second side of the first recess on the first circular substrate is D6, and wherein D5 is approximately equal to D6.

* * * * *